(12) United States Patent
Ootani

(10) Patent No.: US 6,472,854 B2
(45) Date of Patent: Oct. 29, 2002

(54) BATTERY OPERATED POWER CIRCUIT AND DRIVING METHOD THEREOF

(75) Inventor: Mitsuaki Ootani, Tokyo (JP)

(73) Assignee: Taiyo Yuden Co. Ltd., Tokyo (JP)

( * ) Notice: Subject to any disclaimer, the term of this patent is extended or adjusted under 35 U.S.C. 154(b) by 0 days.

(21) Appl. No.: 09/836,162

(22) Filed: Apr. 17, 2001

(65) Prior Publication Data

US 2001/0030528 A1 Oct. 18, 2001

(30) Foreign Application Priority Data

Apr. 17, 2000 (JP) ........................................ 2000-115045

(51) Int. Cl.[7] .............................. G05F 1/40; G05F 1/44
(52) U.S. Cl. ...................... 323/272; 323/284; 323/274
(58) Field of Search .............................. 323/271, 272, 323/273, 274, 282, 284

(56) References Cited

U.S. PATENT DOCUMENTS

| | | | | |
|---|---|---|---|---|
| 5,148,358 A | * | 9/1992 | Estes, Jr. ..................... | 363/24 |
| 5,552,695 A | * | 9/1996 | Schwartz ..................... | 323/271 |
| 6,232,755 B1 | * | 5/2001 | Zhang ......................... | 323/282 |
| 6,259,235 B1 | * | 7/2001 | Fraidlin et al. .............. | 323/222 |

* cited by examiner

*Primary Examiner*—Bao Q. Vu
(74) *Attorney, Agent, or Firm*—Katten Muchin Zavis Rosenman

(57) ABSTRACT

An FET 21 is connected in parallel to a series circuit of a switching device 13 and an inductor 12 between an input terminal 11a and an output terminal 11b, wherein an output voltage $V_{out}$ is dropped only by an operation of the switching device 13; the FET 21 is turned on by a driving circuit 22 when the switching device 13 sustains an on duty factor of 100% so that a series resistance of the switching device 13 and the inductor 12 is connected in parallel to an on resistance of the FET 21, thereby increasing a supply current and extending a period during which an output voltage provided to the output terminal 11b is sustained at a predetermined level. Therefore, a power circuit capable of extending an operating time of a battery-operated power supply, a method for driving same, and further an electronic module implementing same can be obtained.

17 Claims, 12 Drawing Sheets

BATTERY OPERATED POWER CIRCUIT AND DRIVING METHOD THEREOF

FIELD OF THE INVENTION

The present invention relates to a step-down power supply; and, more particularly, to a step-down power circuit capable of extending operating time of a battery-operated power supply, a method for driving same, and further an electronic module implementing same.

BACKGROUND OF THE INVENTION

Conventionally, the voltage of a battery is lowered to a regulated level by a step-down switching made power supply in order to drive electronic circuitry of a portable electronic equipment, e.g., a notebook personal computer or a mobile phone.

Referring to FIG. 1, there is illustrated a conventional step-down switching power supply including an inductor 12 (an inductor for performing a smoothing operation, referred to as an inductor hereinafter), a first switching device 13, a smoothing capacitor 14, a rectifying diode 15, a second switching device 16, a smoothing capacitor 17 and a control IC (integrated circuit), i.e., a controller 18.

The first switching device 13 is, e.g., an P-channel field effect transistor (FET) and serves to convert an input voltage ($V_{in}$) provided from a battery (not shown) through an input terminal 11a to an output voltage ($V_{out}$) provided to an output terminal 11b via the inductor 12.

The smoothing capacitor 14 is connected between the output terminal 11b and the ground. The rectifying diode 15 is connected in parallel with the series connection of the inductor 12 and the smoothing capacitor 14 to sustain an electric current of the inductor 12. The second switching device 16 is also an, e.g., N-channel FET and is coupled to the rectifying diode 15 in parallel. The smoothing capacitor 17 is coupled between the input terminal 11a and the ground.

The controller 18 detects the output voltage ($V_{out}$) on the output terminal 11b and controls an on-off operation of the first and the second switching device 13 and 16 such that the output voltage ($V_{out}$) can be maintained at a predetermined level. The switching devices 13 and 16 are controlled in such a manner that when the first switching device 13 is on, the second switching device 16 is controlled to be turned off, and vice versa.

According to the above described power circuit, when the switching device 13 is on, the input voltage ($V_{in}$) from the input terminal 11a is smoothed by the inductor 12 and the smoothing capacitor 14 and outputted to the output terminal 11b. Meanwhile, the controller 18 adjusts pulse widths of pulse signals, which control the on-off conversions of the first and the second switching device 13 and 16, depending on a variation of the output voltage at the output terminal 11b to perform a feedback control. Accordingly, the regulated constant output voltage can be generated on the output terminal 11b.

As can be seen in FIG. 2, the controller 18 sets up a certain amount of dead time ($t_{DET}$) between an on-state of the first switching device 13 and that of the second switching device 16. Such dead time is required to prevent an undesirable cross current which can occur when both of the switching devices 13 and 16 are turned on concurrently.

Due to such complementary on-off operation of the first and the second switching device 13 and 16, the energy accumulated in the inductor 12 can be emitted during a time period when the switching device 13 is off through the second switching device 16, even when connected to the output terminal 11b is a heavy load (not shown) requiring a great amount of electric current. Accordingly, a highly efficient synchronous rectification can be achieved without suffering from a forward voltage loss which can be otherwise caused by the rectifying diode 15.

In the step-down switching power circuit described above, the respective switching devices 13 and 16 are respectively set to be on and off simultaneously when the input voltage from the battery is reduced down close to the output voltage; and the switching device 13 is maintained at a conduction state without performing any further switching operations in order to maintain the output voltage at the regulated level and extend the operating time of the battery operated power circuit.

However, a considerable voltage drop occurs due to an electric resistance of the switching device 13 and the inductor 12 coupled in series between the input terminal 11a and the output terminal 11b. As a result, the output voltage $V_{out}$ cannot be maintained at the regulated value even though the switching device 13 is controlled to be on without interruption.

As shown in FIG. 3, the input voltage $V_{in}$ from the battery gradually decreases as the operation time of an electronic equipment increases. The output voltage $V_{out}$ declines slowly after the input voltage $V_{in}$ reaches a certain voltage value $V_1$ at a time $t_1$. The voltage $V_1$ is the sum of a preset output voltage $V_{set}$ and a voltage-drop $V_{drp}$, i.e., $V_1 = V_{set} + V_{drp}$, wherein the voltage-drop $V_{drp}$ is produced by a series resistance $R_{t1}$ of a turn-on resistance $R_1$ of the switching device 13 and a resistance $R_L$ of the inductor 12.

Beyond $t_1$, the output voltage $V_{out}$ continuously decreases to reach $V_{min}$ at a time t1' the input voltage $V_{in}$ decreases. The portable electronic equipment ceases its operation when $V_{out}$ drops down to $V_{min}$, the minimum operation voltage of the electronic equipment. As a result, the operation time of the electronic device can be extended by $t_1' - t_1$, which is limited by the considerably large constant voltage drop $V_{drp}$.

SUMMARY OF THE INVENTION

It is, therefore, an object of the present invention to provide a battery-operated step-down power circuit having longer operating time with wide range of operating condition, a method for driving such power circuit, and an electronic component or module capable of implementing the power circuit.

In accordance with a preferred embodiment of the present invention there is provided a power circuit capable of converting an input voltage into an output voltage through a switching and a smoothing operation, comprising: a switching device for performing the switching operation; an inductor for performing the smoothing operation, wherein the inductor is connected in series to the switching device; and a current control device connected in parallel to the switching device and/or the inductor.

In accordance with another preferred embodiment of the present invention, there is provided a power circuit, having a switching device and an inductor connected in series between an input terminal and an output terminal, for generating an output voltage on the output terminal by lowering an input voltage provided through the input terminal by a switching operation of the switching device and monitoring the output voltage to maintain the output voltage at a substantially constant level, the power circuit comprising: a current control device for adjusting an amount of an electric current provided from the input terminal to the output terminal in response to a control signal, wherein the current control device is connected between the input terminal and the output terminal in parallel to the switching device and an inductor; and a driving means for generating the control signal for controlling the current control device to maintain the output voltage at the constant level.

In accordance with still another preferred embodiment of the present invention, there is provided a driving method of a power circuit having a switching device and an inductor connected in series between an input terminal and an output terminal, wherein the power circuit generates an output voltage on the output terminal by lowering an input voltage provided through the input terminal by a switching operation of the switching device and monitors the output voltage to maintain the output voltage at a substantially constant level, the driving method comprising the steps of: providing a current control device for adjusting an amount of an electric current provided from the input terminal to the output terminal in response to a control signal, wherein the current control device is connected between the input terminal and the output terminal in parallel to the switching device and an inductor; and controlling a driving means for generating the control signal for controlling the current control device to maintain the output voltage at the constant level.

In accordance with still another preferred embodiment of the present invention, there is provided an electronic component for use in a power circuit, comprising: a package; an input terminal provided on the package; a first output terminal provided on the package; and a second output terminal provided on the package, wherein the package includes a switching device installed within the package and connected between the input terminal and the first output terminal; a current control device for changing an amount of an electric current provided from the input terminal to the second output terminal based on a control signal, wherein the current control device is installed within the package and connected between the input terminal and the second output terminal; a first control terminal connected to a control terminal of the switching device and installed to be exposed from the package; and a driving circuit for operating the current control device after the switching device is set to sustain an on duty factor of 100%, wherein the driving circuit is installed within the package and connected to a control terminal of the current control device.

BRIEF DESCRIPTION OF THE INVENTION

The above and other objects and features of the present invention will become apparent from the following description of preferred embodiments given in conjunction with the accompanying drawings, in which.

Figure 1:
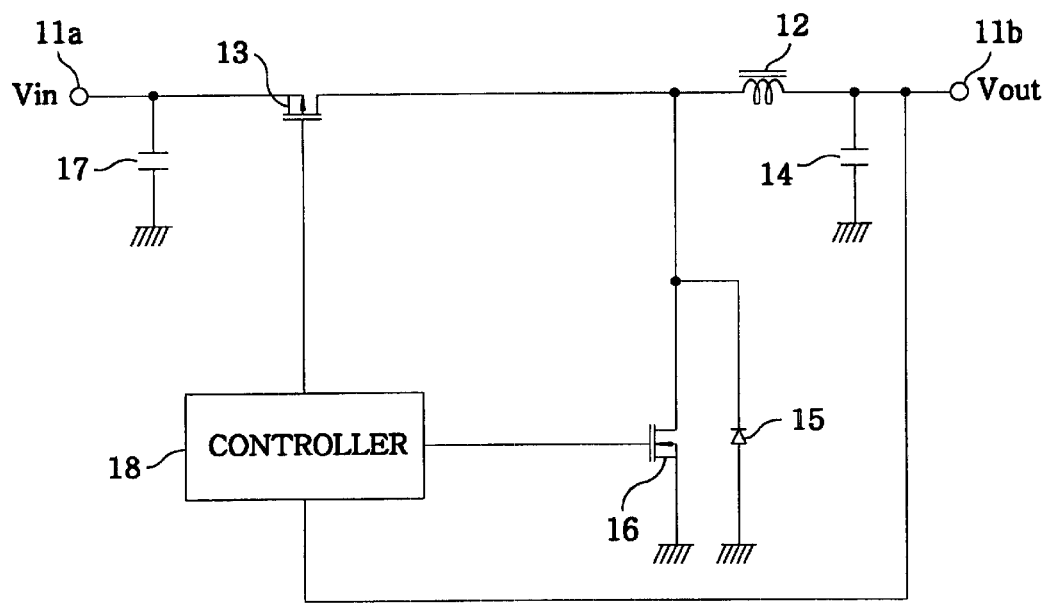
FIG. 1 shows a conventional step-down mode switching power circuit.
Figure 2:
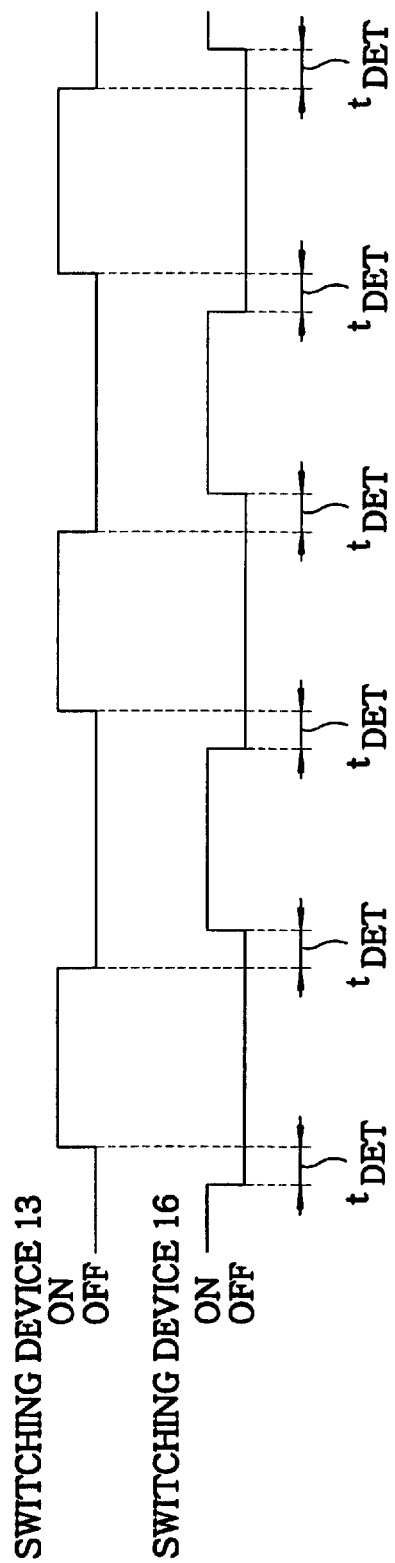
FIG. 2 depicts a timing chart for describing a switching operation of the conventional power circuit shown in FIG. 1.
Figure 3:
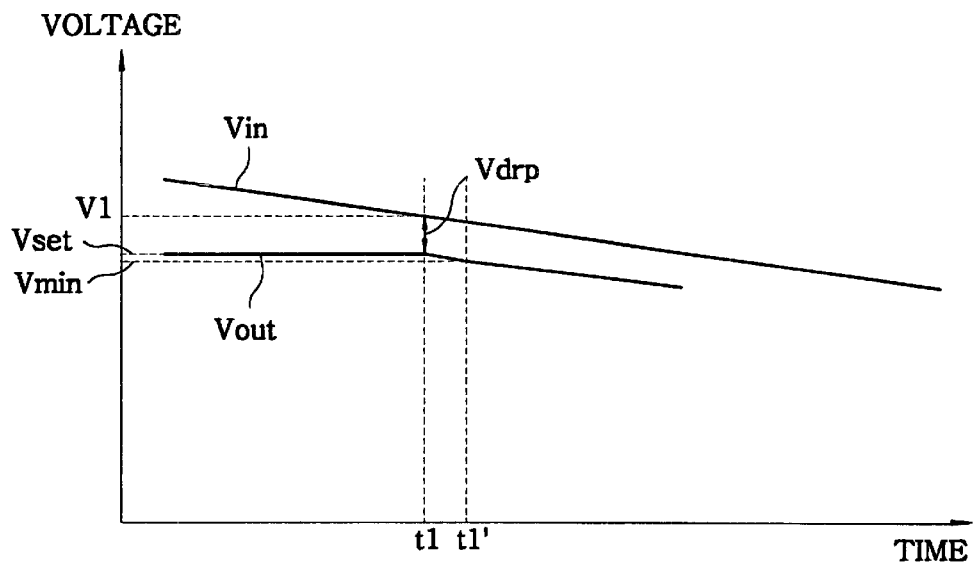
Figure 4:
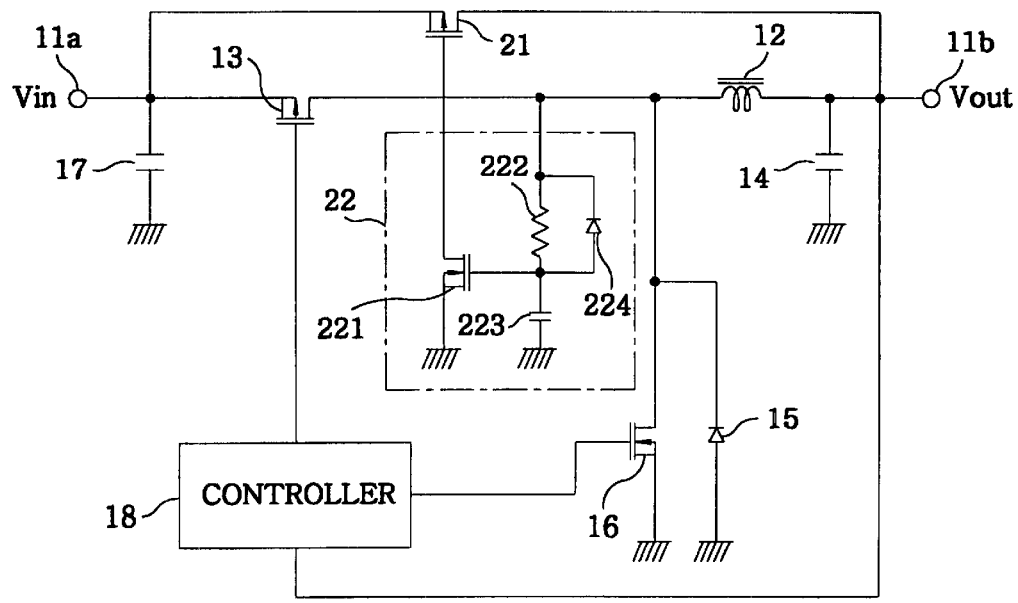
Figure 5:
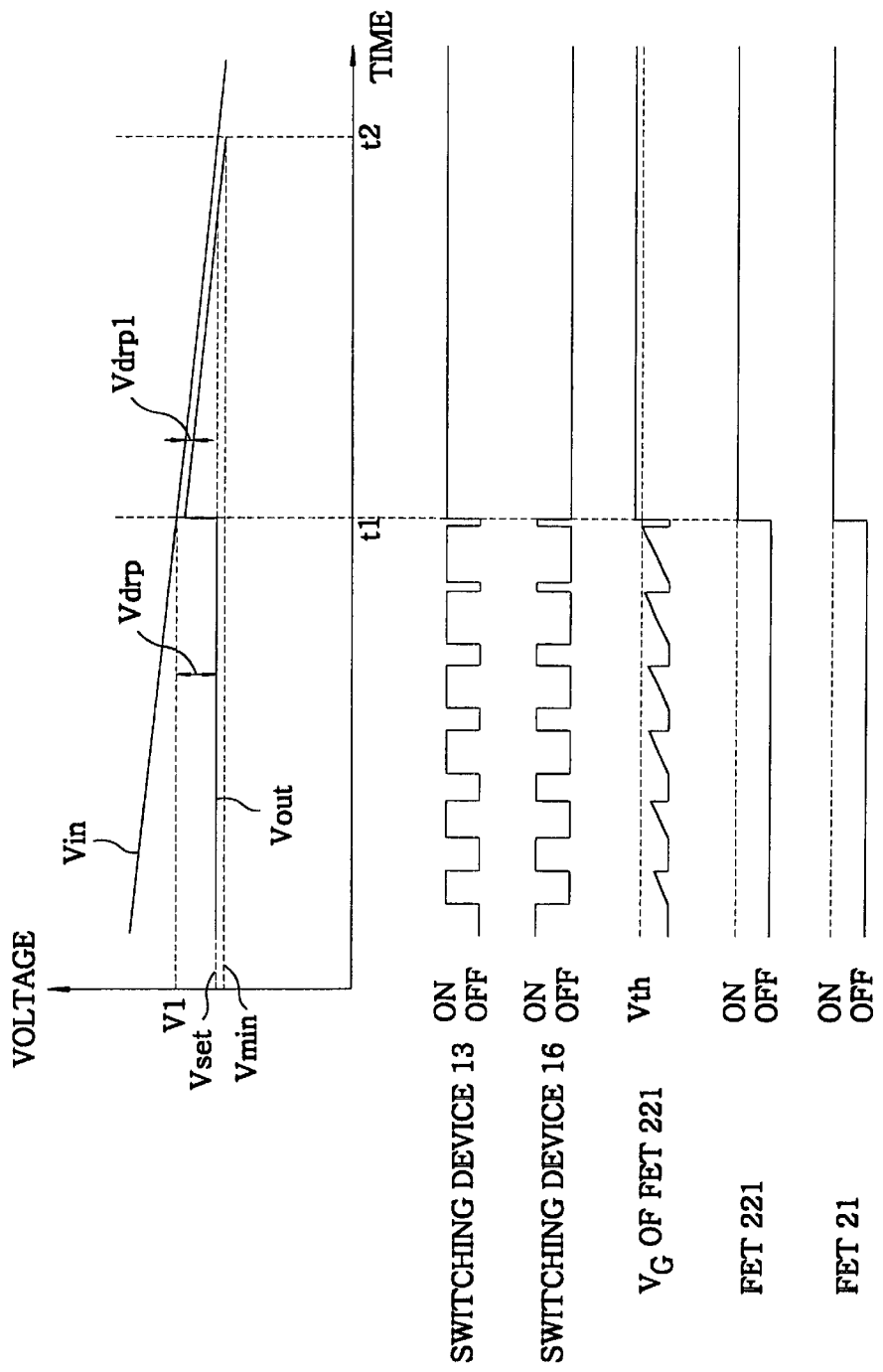
Figure 6:
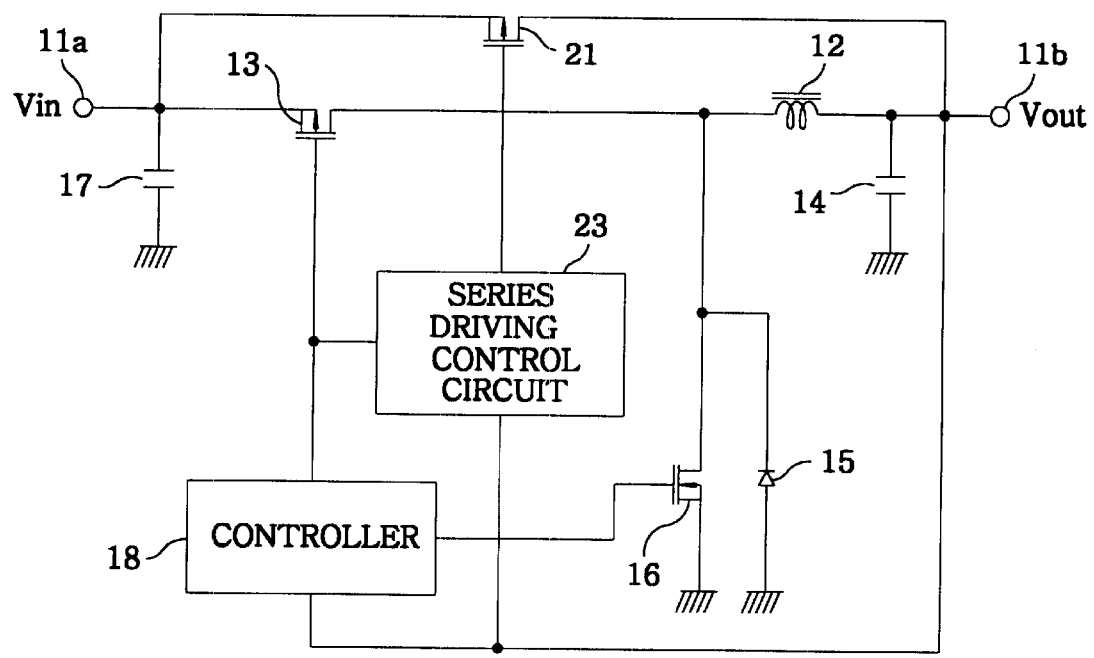
Figure 7:
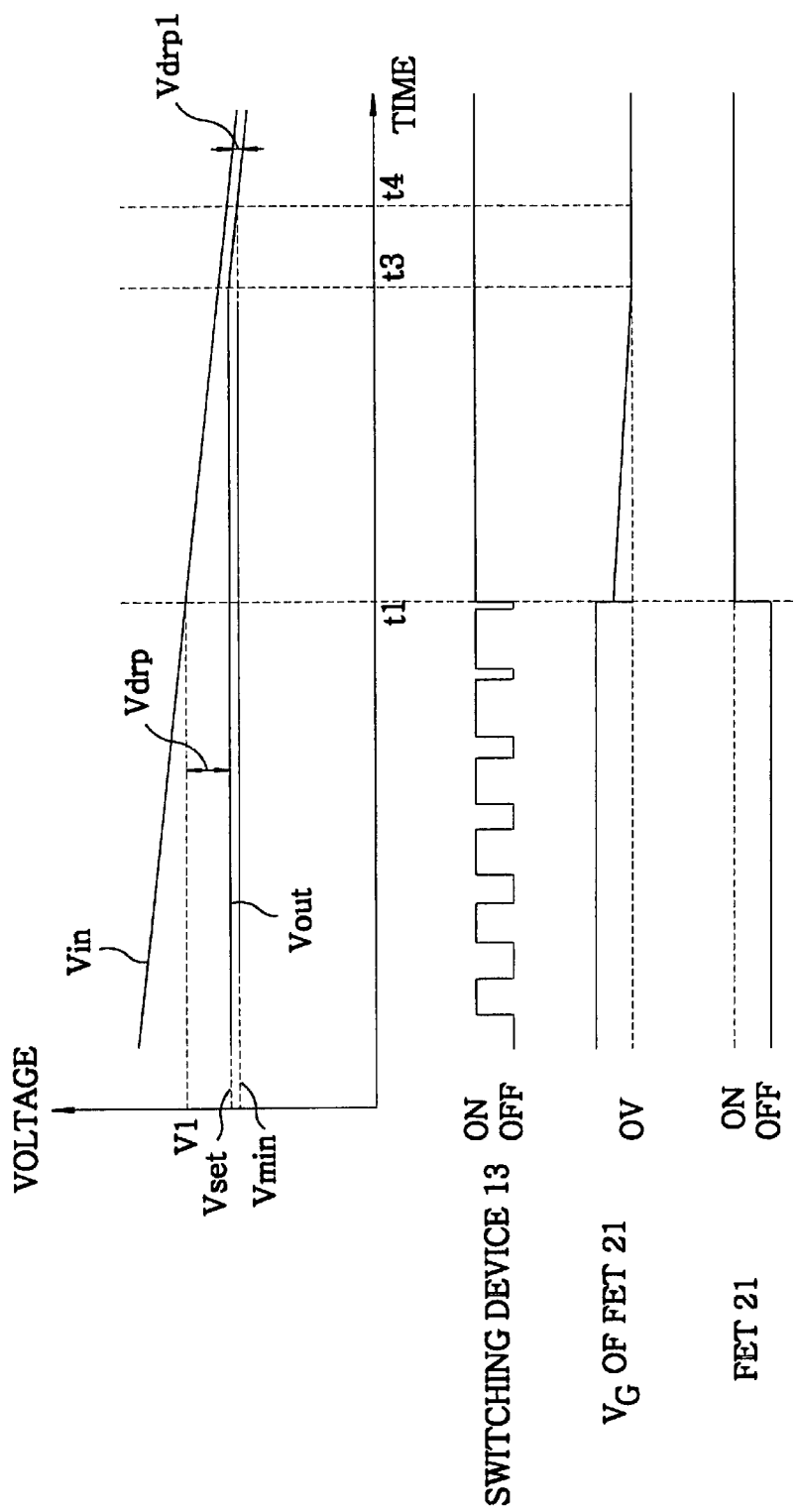
Figure 8:
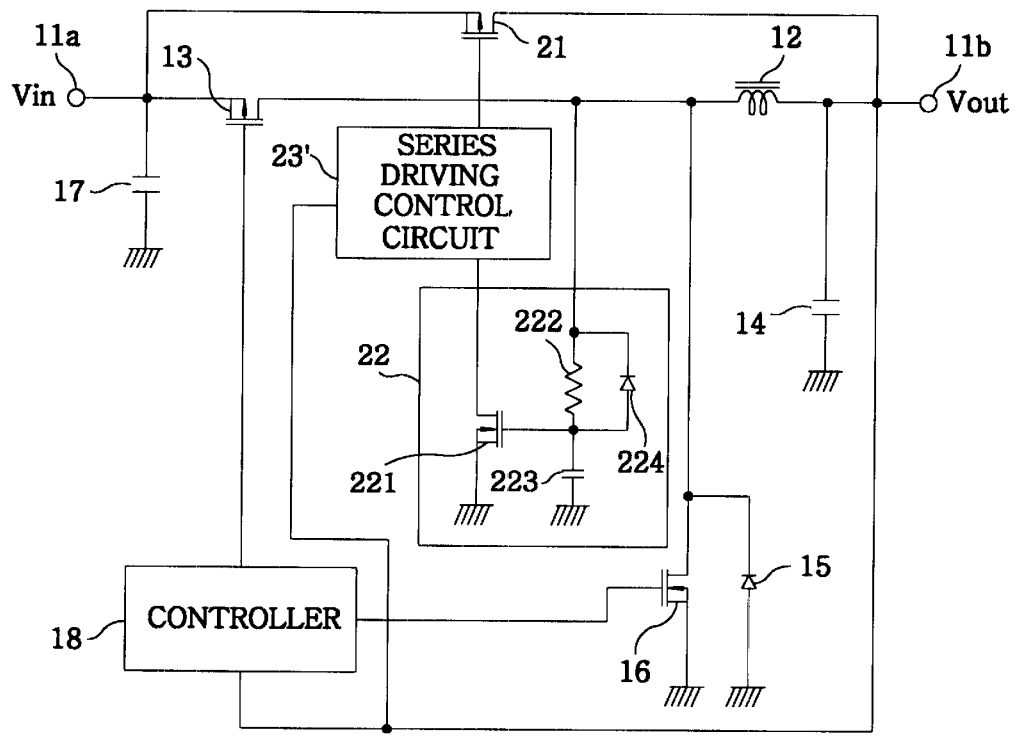
Figure 9:
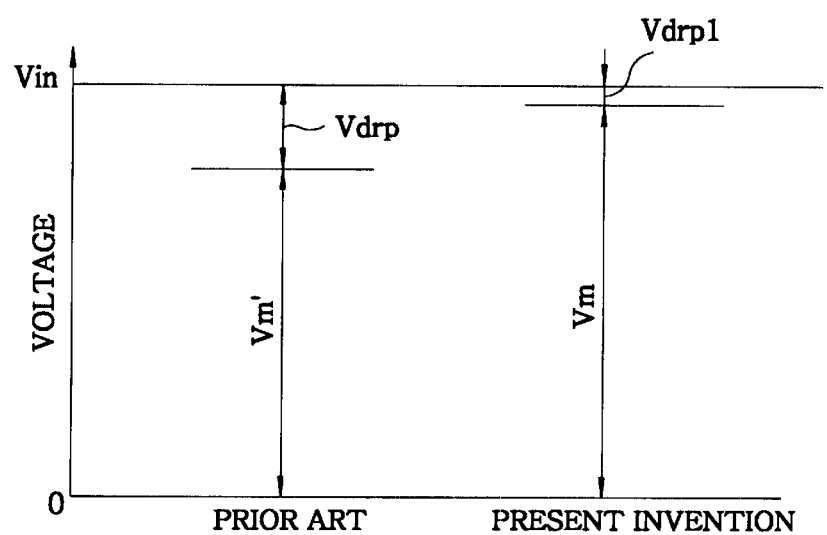
Figure 10:
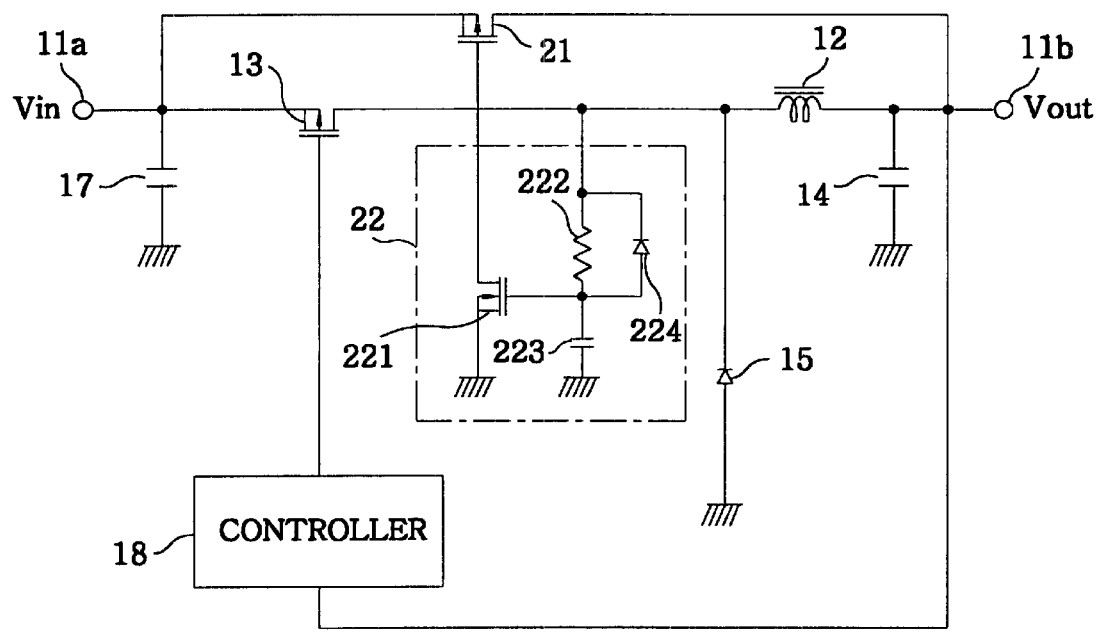
Figure 11:
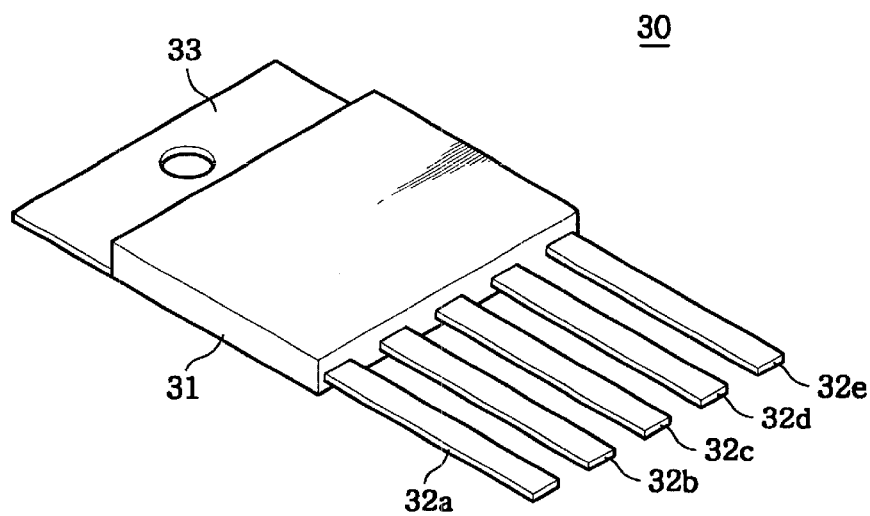
Figure 12:
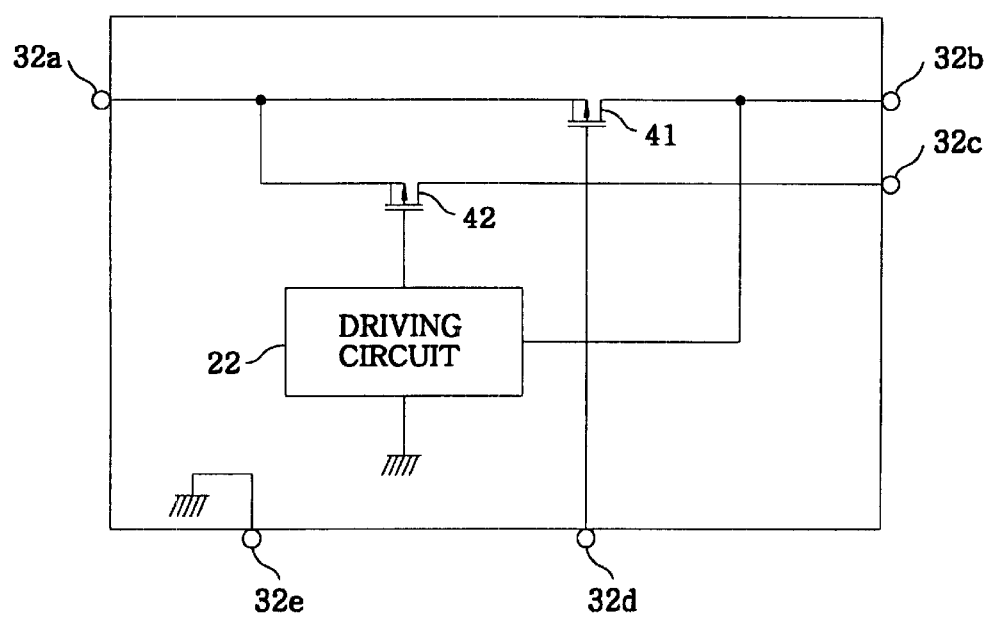
Figure 13:
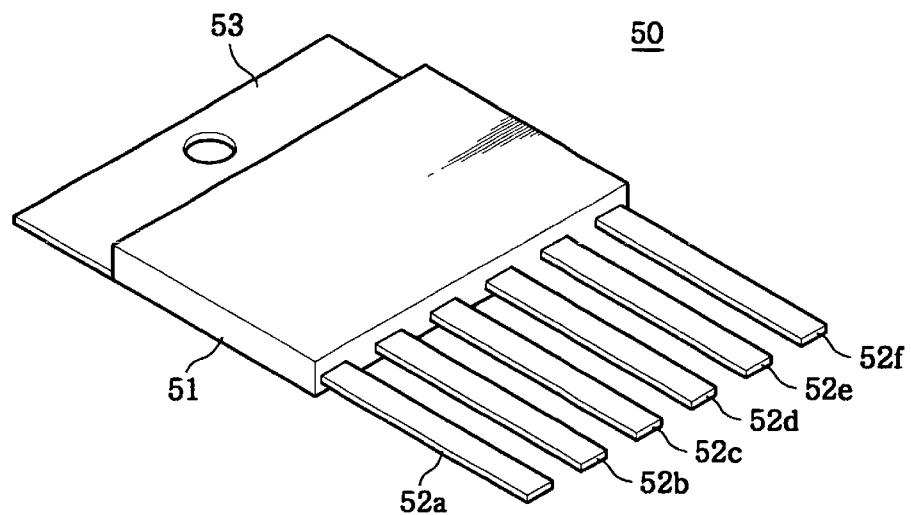
Figure 14:
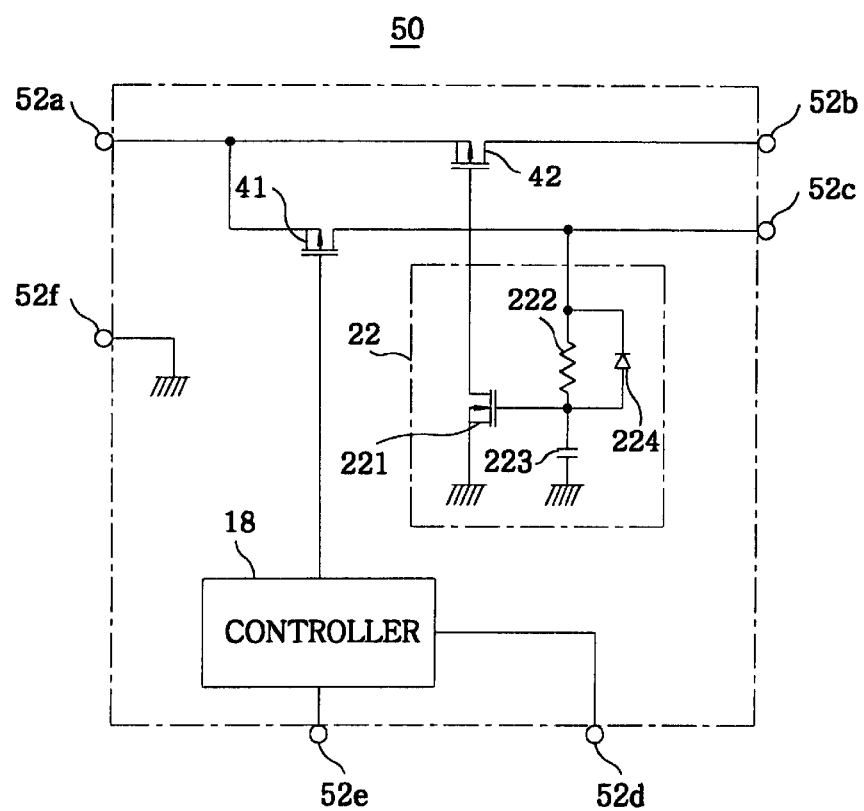
Figure 15:
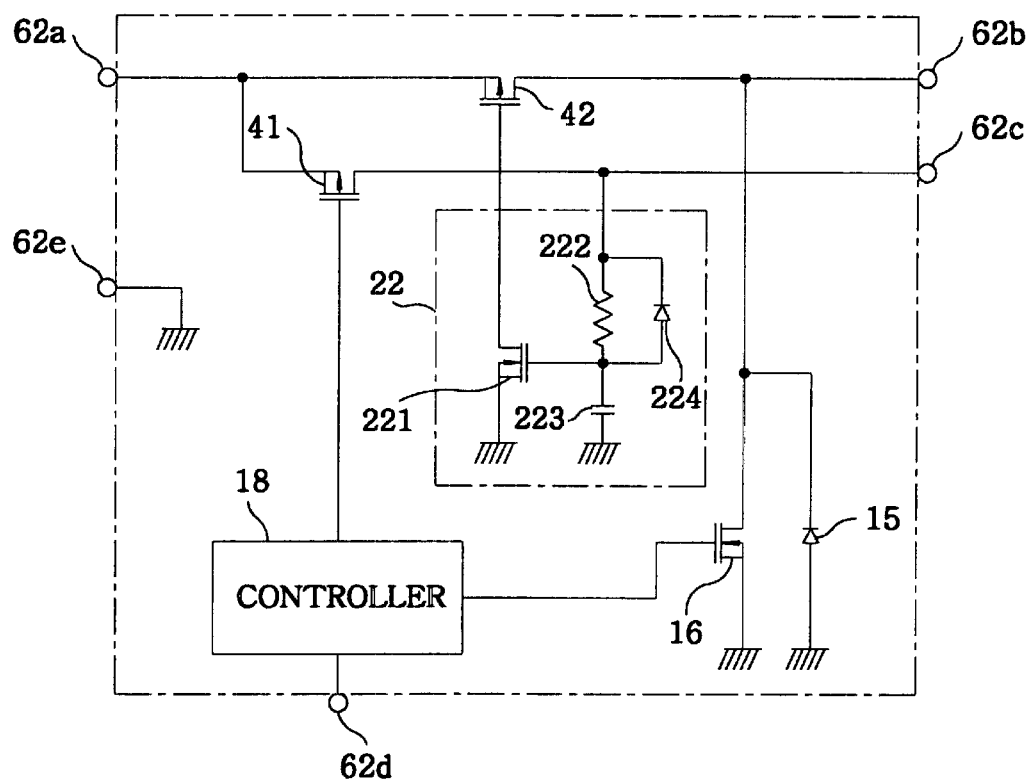
Figure 16:
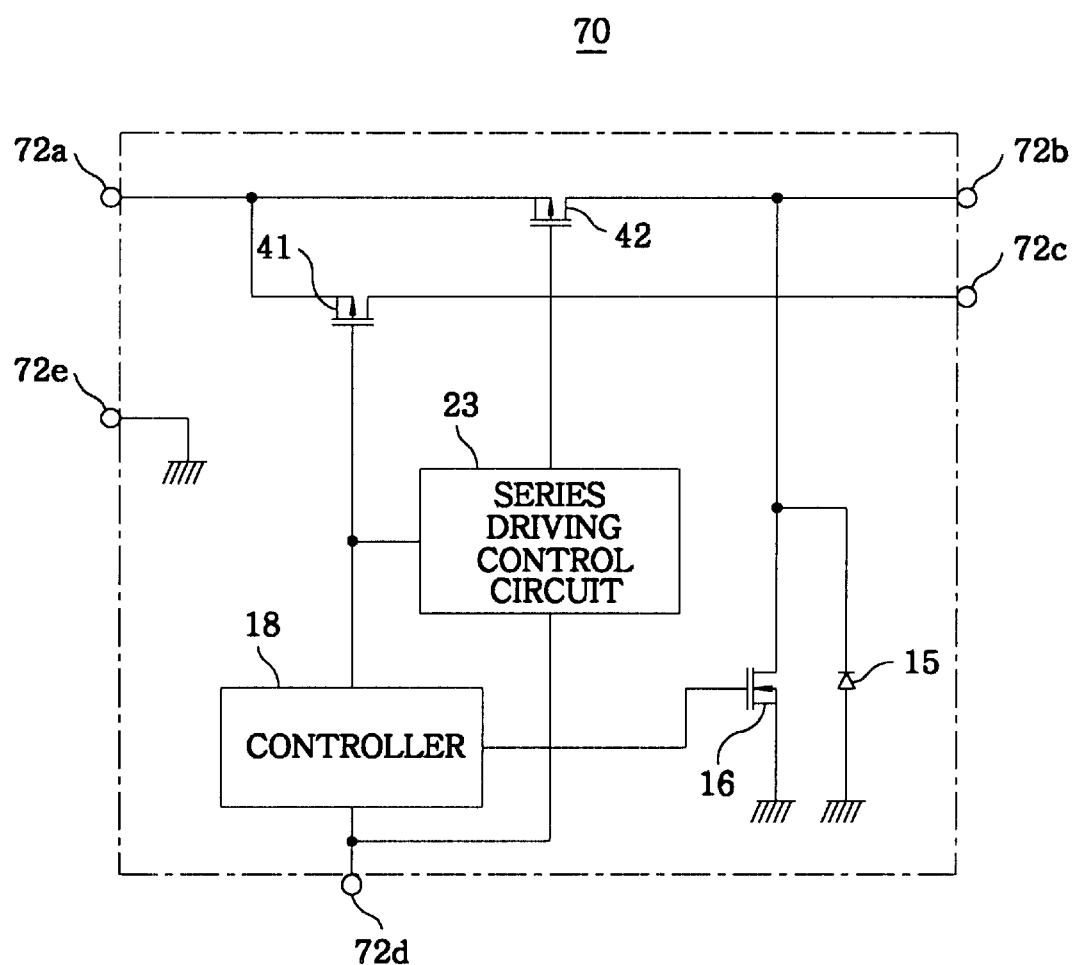

FIG. 3 describes a variation of an output voltage according to a variation of an input voltage in the power circuit shown in FIG. 1;

FIG. 4 illustrates a power circuit in accordance with a first preferred embodiment of the present invention;

FIG. 5 is a timing chart for explaining an output voltage and a control scheme therefor in accordance with the first preferred embodiment of the present invention;

FIG. 6 presents a circuit diagram of a power circuit in accordance with a second preferred embodiment of the present invention;

FIG. 7 provides a timing chart for describing an output voltage and a control scheme therefor in accordance with the second preferred embodiment of the present invention;

FIG. 8 offers an alternative circuit diagram for the power circuit in accordance with the second preferred embodiment of the present invention;

FIG. 9 outlines the difference between the output voltages of the prior art and the inventive power circuit;

FIG. 10 exhibits a circuit diagram for showing another power circuit in accordance with the second embodiment of the present invention;

FIG. 11 displays a perspective view of an electronic component in accordance with the present invention;

FIG. 12 depicts a circuit diagram of the electronic component in accordance with the third embodiment of the present invention;

FIG. 13 shows a perspective view of an electronic component in accordance with a fourth embodiment of the present invention;

FIG. 14 presents a circuit diagram of the electronic component in accordance with the fourth embodiment of the present invention;

FIG. 15 is an alternative circuit diagram of the electronic component in accordance with the present invention; and FIG. 16 sets forth still another alternative circuit diagram of the electronic component in accordance with the present invention.

DETAILED DESCRIPTION OF THE INENTION

Preferred embodiments of the present invention will now be described in detail with reference to the accompanying drawings, wherein like reference numerals are used to designate like or equivalent parts throughout the description.

Referring to FIG. 4, there is provided a power circuit in accordance with a first embodiment of the present invention wherein, a current control device, e.g., a P-channel FET (field effect transistor) 21 and a driving circuit 22 thereof are added to the conventional power circuit described with reference to FIG. 1. A source and a drain of the FET 21 are connected to an input terminal 11a and an output terminal 11b, respectively, in parallel with the series connection of a first switching device 13 and an inductor 12. A gate of the FET 21 is connected to the driving circuit 22. However, another configuration is also possible where the P-channel FET is connected in parallel with only one of the first switching device 13 and the inductor 12.

The driving circuit 22 includes an N-channel FET 221, a resistor 222, a capacitor 223 and a diode 224. A source and a drain of the FET 221 are respectively coupled to the ground and the gate of the FET 21. A gate of the FET 221 is connected to a first terminal of the resistor 222 and an anode of the diode 224, and is also connected to the ground through the capacitor 223. A second terminal of the resistor 222 and a cathode of the diode 224 are coupled to the drain of the switching device 13.

In the power circuit shown in FIG. 4, the first switching device 13 is switching operated by a controller 18 so that an output voltage $V_{out}$ is controlled to have a constant predetermined voltage value $V_{set}$ until an input voltage $V_{in}$ reaches a certain voltage value $V_1$, as can be seen in FIG. 5. The FET 21 is set to be off until the input voltage $V_{in}$ drops to the voltage $V_1$, and, thereafter, the FET 21 is set to be completely turned on to obtain a minimum turn-on resistance.

To be specific, when the first switching device 13 is on during a switching mode operation period up to $t_1$, a second switching device 16 is set to be off. During that period when the switching devices 13 and 16 are on and off, the capacitor 223 is charged through the resistor 222 and a gate voltage $V_G$ of the FET 221 gradually increases. Subsequently, when the switching device 16 is turned on, electric charges accumulated in the capacitor 223 are discharged through the diode 224 and the second switching device 16, and, therefore, the gate voltage $V_G$ of the FET 221 falls down to 0 V. The resistor 222 and the capacitor 223 are adapted to have such an RC time constant. At this time, a charging time constant of the capacitor 223 controls the gate voltage $V_G$ of the FET 221 so that the FET 221 does not turn to the on state while the switching device 16 is off. By such control, the FET 21 is also kept to be off during the time while the FET 221 is off. As a result, the FET 221 and the FET 21 remain to be off during the switching mode control period up to $t_1$.

When the input voltage $V_{in}$ drops to the voltage $V_1$, the first and the second switching device 13 and 16 are controlled by the controller 18 to be of the duty ratios or factors of 100% (always on) and 0% (always off), respectively. As a result, the gate voltage of the FET 221 is pulled up beyond a threshold voltage $V_{th}$ and the FET 221 is set to be on. With the turn on of the FET 221, the gate of the FET 21 is grounded and thus the FET 21 is set to be on. The output voltage $V_{out}$ is set to be $V_{in}-V_{drpl}$, and gradually declines as the input voltage $V_{in}$ from the battery decreases with time. $V_{drpl}$ represents a voltage drop caused by a resultant resistance of the first switching device 13, the inductor 12 and the FET 21. $V_{drpl}$ is smaller than the voltage drop $V_{drp}$ caused by the switching device 13 and the inductor 12 only as in the conventional power circuit shown in FIG. 1.

To be more specific, the resultant resistance $R_{12}$ can be defined as follows:

$$R_{i2} = \frac{\{(R_1 + R_L) \times R_2\}}{\{R_1 + R_L + R_2\}}$$

wherein $R_1$, $R_L$ and $R_2$ represent a turn-on resistance of the first switching device 13, a resistance of the inductor 12 and a turn on resistance of the FET 21, respectively. $R_{12}$ is smaller than $R_{i1}(=R_1+R_L)$ of the conventional power circuit shown in FIG. 1 and, therefore, $V_{drpl}$, becomes smaller than $V_{drp}$.

Accordingly, the operation time of the equipment can be extended up to $t_2$ at which the output voltage $V_{out}$ reaches a minimum operation voltage $V_{min}$ of the equipment. The extended operation time $t_2-t_1$ is greater than $t_1'-t_1$ of the conventional power circuit shown in FIG. 1 due to the reduced voltage drop $V_{drpl}$. The output voltage ($V_{out}=V_{in}-V_{drpl}$) at $t_1$ should be smaller than a maximum operation voltage $V_{max}$ of the equipment.

Referring to FIG. 6, there is illustrated a block diagram of a power circuit in accordance with a second embodiment of the present invention. FIG. 7 is a timing chart for describing a switching operation thereof. The power circuit in accordance with the second embodiment differs from the power circuit of the first embodiment in that a P-channel FET 21 is controlled by a series driving control circuit 23.

A source, a drain and a gate of the FET 21 are coupled to an input terminal 11a, an output terminal 11b and the series driving control circuit 23, respectively.

The series driving control circuit 23 detects an output voltage $V_{out}$ and a gate voltage of a first switching device 13 and activates the FET 21 when the first switching device 13 becomes to have 100% of on duty ratio(always on).

Alternatively, as shown in FIG. 8, the driving circuit 22 of FIG. 4 can be used to control a series driving controller 23'.

The driving control circuit 23' is functionally identical to that of the series driving control circuit 23 in FIG. 6 excepting that the fact that the control circuit 23' converts an on-off state of the FET 21 depending on an output signal of the driving circuit 22 in lieu of that of a controller 18.

The series driving control circuit 23 performs the so-called series operation as in a three terminal regulator to control the FET 21. In other words, the series driving control circuit 23 controls the turn-on resistance (a saturation voltage) of the FET 21 by varying the gate voltage of the FET 21 in order to provide the output voltage $V_{out}$ set to be a preset voltage $V_{set}$. As a result, the amount of electric current provided through the FET 21 to the output terminal 11b is controlled, so that the output voltage $V_{out}$ is maintained at the preset level $V_{set}$.

At a time $t_3$, the turn-on resistance of the FET 21 becomes minimum by the series driving control circuit 23 and the FET 21 becomes completely turned on. Beyond $t_3$, the output voltage $V_{out}(V_{out}=V_{in}-V_{drpl})$ gradually decreases with the decrease of the input voltage $V_{in}$, as in the first embodiment until it finally reaches the minimum voltage $V_{min}$.

As a result, the operation time can be extended until the output voltage $V_{out}$ reaches the minimum voltage $V_{min}$ at a time $t_4$. The extended operation time $t_4-t_1$, is much greater than that of $t_1'-t_1$ of the prior art shown in FIG. 3.

In the second embodiment, there is required no such limitation of $V_{out}<V_{max}$ as in the first preferred embodiment since the output voltage $V_{out}$ is maintained at a predetermined level, i.e., $V_{set}$, by making the FET 21 perform the series operations after the on duty ratio of the first switching device 13 becomes 100% at $t_1$. Initiation of the series operation of the FET 21 after the on duty ratio of the first switching device 13 becomes 100% is advantageous in terms of efficiency compared to the case where the series operation is initiated before the on duty ratio of the first switching device 13 reaches 100%.

In addition, if the FET 21 is set to perform the series operation when the first switching device 13 is performing the switching operation, the maximum output voltage of the power circuit can be increased. As can be seen in FIG. 9, a maximum output voltage $V_m=V_{in}-V_{drpl}$ in accordance with the present invention is greater than the maximum output voltage $V_m'=V_{in}-V_{drp}$ of the conventional power circuits. Further, when the output voltage is set to have the constant value $V_{set}$ after $t_1$ as shown in FIG. 7, the operation range of the power circuit can be enlarged for the input voltage.

An asynchronous rectification mode switching power circuit can be employed in lieu of the synchronous rectification mode switching power circuits in accordance with the preferred embodiments of the invention. In FIG. 10, there is illustrated an exemplary asynchronous rectification mode power circuit obtained by removing the second switching device 16 from FIG. 4.

FIG. 11 sets forth a perspective view of an electronic module or component 30 in accordance with a third preferred embodiment of the present invention and FIG. 12 is a circuit diagram thereof. The electronic component 30 is of a five-terminal SIP (Single In-line Package) type comprising a package 31, five lead terminals 32a to 32e and a heat radiation plate 33.

The package 31 includes a driving circuit 22 as well as two FETs 41 and 42. The FETs 41 and 42 respectively correspond to the switching device 13 and the FET 21 in the first embodiment shown in FIG. 4 and the driving circuit 22 is identical to that of the first embodiment.

Sources of the two FETs 41 and 42 are coupled to the lead terminal 32a and drains thereof are connected to the lead terminals 32b and 32c, respectively. Further, a gate of the FET 41 is led to the lead terminal 32d and that of the FET 42 is connected to a drain of an FET 221 of the driving circuit 22 as shown in FIG. 4. The driving circuit 22 is connected to the lead terminal 32b to receive an output signal from the FET 41. A ground terminal of the driving circuit 22 is connected to the lead terminal 32e. The power circuit in accordance with the first preferred embodiment shown in FIG. 4 can be implemented by using the electronic component 30 as shown in FIGS. 11 and 12.

FIG. 13 depicts a perspective view of an electronic component 50 in accordance with a fourth embodiment of the present invention and FIG. 14 offers a power circuit thereof. The electronic component 50 is of a shape of six-terminal SIP type including a package 51, six lead terminals 52a to 52f and a heat radiation plate 53.

As shown in FIG. 14, the package 51 has two FETs 41 and 42, a controller 18 and a driving circuit 22, wherein the two FETs 41 and 42 respectively correspond to the switching device 13 and the FET 21 of the first embodiment shown in FIG. 4 and a controller 18 and a driving circuit 22 are identical with those described therein.

Sources of the FETs 41 and 42 are connected to the lead terminal 52a and drains of the FETs 41 and 42 are led to the lead terminal 52c and 52b, respectively. Gates of the FETs 41 and 42 are coupled to the controller 18 and the driving circuit 22, respectively. A feedback input of an output voltage $V_{out}$ and a control signal output of the controller 18 are connected to the lead terminals 52d and 52e. Further, there is installed a ground terminal 52f. The power circuit of the first preferred embodiment can be implemented by using the electronic component 50.

Referring to FIG. 15, there is illustrated another exemplary electronic component 60 formed by adding a second switching device 16 and a rectification diode 15, both of which are presented in the first embodiment, to the package of the fourth embodiment of the present invention.

Referring to in FIG. 16, there is illustrated still another exemplary electronic component 70 having a series driving controller 23, as used in the second embodiment instead of the driving circuit 22.

Bipolar transistors can be employed in lieu of the FETs. In this case, the control is accomplished by controlling a base current to alter a saturation current or a saturation voltage. A variable resistance device can be also employed as the current control device.

While the invention has been shown and described with respect to the preferred embodiments, it will be understood to those skilled in the art that various changes and modifications may be made without departing from the spirit and scope of the invention as defined in the following claims.

What is claimed is:

1. A power circuit, having a switching device and an inductor connected in series between an input terminal and an output terminal, for generating an output voltage on the output terminal by lowering an input voltage provided through the input terminal by a switching operation of the switching device and monitoring the output voltage to maintain the output voltage at a substantially constant level, the power circuit comprising:
    a current control device for adjusting an amount of an electric current provided from the input terminal to the output terminal in response to a control signal, wherein the current control device is connected between the input terminal and the output terminal in parallel to the switching device and an inductor; and
    a driving means for generating the control signal for controlling the current control device to maintain the output voltage at the constant level.

2. The power circuit of claim 1, wherein the driving means activates the current control device after a duty factor of a pulse signal for controlling the switching operation of the switching device becomes 100%.

3. The power circuit of claim 2, wherein the driving means determines whether or not the duty factor of the pulse signal is 100% in response to an output signal from the switching device.

4. The power circuit of claim 2, wherein the driving means determines whether or not the duty factor of the pulse signal is 100% in response to the pulse signal.

5. The power circuit of claim 1, wherein the current control device is a transistor and the driving means changes a saturated current of the transistor by controlling a base current thereof.

6. The power circuit of claim 1, wherein the current control device is a field effect transistor and the driving means changes a turn-on resistance of the field effect transistor by controlling a gate voltage thereof.

7. A driving method for a power circuit having a switching device and an inductor connected in series between an input terminal and an output terminal, wherein the power circuit generates an output voltage on the output terminal by lowering an input voltage provided through the input terminal by a switching operation of the switching device and monitors the output voltage to maintain the output voltage at a substantially constant level, the driving method comprising the steps of:
    providing a current control device for adjusting an amount of an electric current provided from the input terminal to the output terminal in response to a control signal, wherein the current control device is connected between the input terminal and the output terminal in parallel to the switching device and an inductor; and
    controlling a driving means for generating the control signal for controlling the current control device to maintain the output voltage at the constant level.

8. The method of claim 7, wherein the current control device is operated in combination with the switching operation of the switching device.

9. The method of claim 7, wherein the current control device is activated after a duty factor of a pulse signal for controlling the switching operation of the switching device becomes 100%.

10. The method of claim 9, wherein whether or not the duty factor of the pulse signal is 100% is determined in response to an output signal from the switching device.

11. The method of claim 9, wherein whether or not the duty factor of the pulse signal is 100% is determined in response to the control signal.

12. An electronic component for use in a power circuit, comprising:
    a package;
    an input terminal provided on the package;
    a first output terminal provided on the package;
    a second output terminal provided on the package;
    an inductor for performing the smoothing operation, wherein the inductor is connected between the first output terminal and the second output terminal;
    a switching device for performing a switching operation, wherein the switching device is installed within the package and connected between the input terminal and the first output terminal;
    a current control device for changing an amount of an electric current provided from the input terminal to the second output terminal based on a control signal, wherein the current control device is installed within the package and connected between the input terminal and the second output terminal; and a driving circuit for operating the current control device after the switching device is set to sustain an on duty factor of 100%, wherein the driving circuit is installed within the package and connected to a control terminal of the current control device, wherein the power circuit generates an output voltage on the second output terminal by lowering an input voltage provided through the input terminal by the switching operation of the switching device and monitoring the output voltage to maintain the output voltage at a substantially constant level.

13. The component of claim 12, wherein the driving circuit activates the current control device in response to an output signal from the first output terminal.

14. The component of claim 12, wherein the driving circuit activates the current control device in response to an input signal from the first control terminal provided on the package.

15. The component of claim 12, further comprising a control circuit for controlling an on-off conversion of the switching device in response to a control signal inputted from the first control terminal, wherein the control circuit is installed within the package and connected between a control terminal of the switching device and the first control terminal.

16. The component of claim 12, wherein the current control device is a transistor and the driving circuit changes a saturated voltage of the transistor by controlling a base current thereof.

17. The component of claim 12, wherein the current control device is a field effect transistor and the driving circuit changes a turn-on resistance of the field effect transistor by controlling a gate voltage thereof.

* * * * *